Jan. 30, 1962  L. DENIS ETAL  3,018,748
DEVICE FOR THE TRANSPORT OF FREIGHT, AND IN PARTICULAR LIQUID
OR POWDERED LOADS OF COMMERCIAL VALUE, IN
WATER AND ESPECIALLY IN SEA WATER

Filed Oct. 7, 1957  6 Sheets-Sheet 1

INVENTORS
LOUIS DENIS
PIERRE B. WOLFF
JOSEPH J. M. R. BROCARD
BY
ATTORNEYS

Jan. 30, 1962 L. DENIS ETAL 3,018,748
DEVICE FOR THE TRANSPORT OF FREIGHT, AND IN PARTICULAR LIQUID
OR POWDERED LOADS OF COMMERCIAL VALUE, IN
WATER AND ESPECIALLY IN SEA WATER
Filed Oct. 7, 1957 6 Sheets-Sheet 3

INVENTORS
LOUIS DENIS
PIERRE B. WOLFF
JOSEPH J. M. R. BROCARD
BY
ATTORNEYS

Jan. 30, 1962 L. DENIS ET AL 3,018,748
DEVICE FOR THE TRANSPORT OF FREIGHT, AND IN PARTICULAR LIQUID
OR POWDERED LOADS OF COMMERCIAL VALUE, IN
WATER AND ESPECIALLY IN SEA WATER
Filed Oct. 7, 1957 6 Sheets-Sheet 5

INVENTORS
LOUIS DENIS
PIERRE S. WOLFF
JOSEPH J.M.R. BROCARD
BY

ATTORNEYS

Jan. 30, 1962   L. DENIS ETAL   3,018,748
DEVICE FOR THE TRANSPORT OF FREIGHT, AND IN PARTICULAR LIQUID
OR POWDERED LOADS OF COMMERCIAL VALUE, IN
WATER AND ESPECIALLY IN SEA WATER
Filed Oct. 7, 1957   6 Sheets-Sheet 6

INVENTORS
LOUIS DENIS
PIERRE B. WOLFF
JOSEPH J.M.R. BROCARD
BY Diggins & LeBlanc
ATTORNEYS

United States Patent Office 3,018,748
Patented Jan. 30, 1962

3,018,748
DEVICE FOR THE TRANSPORT OF FREIGHT, AND IN PARTICULAR LIQUID OR POWDERED LOADS OF COMMERCIAL VALUE, IN WATER AND ESPECIALLY IN SEA WATER
Louis Denis, Pierre Benjamin Wolff, and Joseph Jean Marie Rodolphe Brocard, Paris, France, assignors to Societe d'Etudes pour le Stockage et le Transport sous-marins des Fluides (S.O.M.A.F.), Paris, France, a corporation of France
Filed Oct. 7, 1957, Ser. No. 688,726
Claims priority, application France Oct. 8, 1956
20 Claims. (Cl. 114—74)

The object of the present invention is to facilitate the transport of merchandise, and in particular liquid or powdered products, on the sea, water-ways or lakes.

At the present time, merchandise in general is transported over water by ships comprising rigid or substantially rigid hulls which sail on the surface.

Such a ship sailing on the surface is subjected to considerable dynamic stresses due to the movement of its hull through two fluids (water and the surrounding air) in the neighborhood of and in their zone of separation, which is the centre of irregular, often very violent, movements (storms). The agitation of the sea and the speed of the wind exert forces on the ship which are essentially variable in respect of their point of application, their direction and their intensity, and it is necessary to calculate the characteristics of the ship to permit it to resist the maximum stresses it is likely to encounter in service and to provide a hull of sufficient rigidity notwithstanding these stresses. As a result of these two conditions, present-day ships are expensive, take a long time to build and have a heavy unloaded weight, that is, dead weight.

Further, a conventional rigid ship sailing on the surface has a profile which has not the most advantageous forms from the point of view of resistance to displacement since for a number of well-known reasons it is necessary considerably to modify the forms corresponding to least resistance to displacement.

The object of the present invention is to remedy the aforementioned disadvantages by effecting the transport of merchandise, and in particular liquid or powdered merchandise, over the water with an energy output very close to the minimum theoretical energy by means of devices which have a reduced light or unloaded weight and are easily, rapidly and cheaply mass-produced, it being possible to fold up said devices into a small volume when no load is carried on the return journey, as for example in the case of the transport of petroleum products, or even to dispose of them after use owing to their low cost price.

According to the invention, the transport of freight is effected in flexible hulls or containers which travel below the surface of separation of the water and the air of the atmosphere or at sufficient depth so as to be substantially removed from the surface and atmospheric disturbances, these hulls or containers having substantially the shape of a solid having the least resistance to displacement.

As concerns the material of which the hull is composed, it is necessary that it be resistant, on the one hand, to the action of sea water and, on the other hand, to the action of the liquid or other product transported. This material could be plastified polyvinyl chloride, a superpolyamide, synthetic rubber or like material.

As the device has no need to have an increased mechanical resistance to resist the dynamic forces of the surface of the water and the most adverse weather conditions, since it is not exposed to the latter, it can be constructed from a relatively thin, flexible, cheap sheath. Further, its weight when empty, or dead weight, is reduced to the minimum and in consequence transport thereof when loaded or if desired, when empty (return journey), requires a reduced energy output.

According to a preferred embodiment of the invention, the device comprises two parts, each hull forming a main container which contains a number of secondary containers adapted to receive the freight and composed of a flexible material resisting sea water attack and attack of the material transported, each secondary container being provided with filling and/or emptying apertures and, if desired, devices fixed on their outer wall for handling purposes.

In this case, the hull is advantageously composed of strips of flexible material resistant to sea water action which are disposed longitudinally edge to edge and interconnected by an assembly of connecting means, such as hinges, rigid with their adjacent edges, said strips being furthermore connected at their ends to two preferably rigid members forming the forward end (prow) and rear end (stern) of the hull.

Owing to this arrangement, the containers which contain the freight and must be absolutely fluid-tight and, when transporting hydrocarbons, must be of a material which resists the action of the transported product, can be in the form of simple cylinders, cones or truncated cones or other simple shapes having a thin and flexible wall, whereas the outer container, which forms the hull and merely encloses these containers, protects them against blows or other mechanical actions, and determines the outer shape of the device, need not be fluid-tight and can be constructed of a material which is only resistant to sea water attack and has sufficient thickness or is suitably reinforced to oppose the tractive deforming forces and blows or other internal or external mechanical actions.

This arrangement has a further advantage of facilitating handling in the port and permitting at any time the loading of small amounts which can be handled by conventional handling means.

In the event of damage or accidents as the secondary containers are independent of one another, the loss of freight is limited to relatively small amounts which restrict the losses and could leave the hydraulic equilibrium of the container assembly substantially unmodified.

The arrangement of separate secondary containers facilitates the maintenance and the partial replacement of the elements of a main container. It facilitates dismantling for transport of empty main containers.

It will be understood that the secondary containers could be withdrawn for the purpose of individual loading, or could be left in the position they occupy inside the main container when loading and emptying.

According to a feature of construction of the strips forming the hull, each of their longitudinal edges comprises alternating projections and recesses or crenels which interlock with crenels formed in adjacent strips, each crenel forming a beading, if desired reinforced, in which is provided an aperture for the passage of a cable which ensures the connection and articulation between two adjacent strips and is attached at its ends to the prow and stern members to which the strips are fixed.

By means of this arrangement, the set of cables forming the articulations of the strips also withstand the tractive forces to which the transport device could be subjected and this permits reducing the thickness or the reinforcement of the strips forming the hull.

Such a transport device could be propelled in several ways:

(a) Propelling means could be connected to the hull outside the latter or in the part of the flexible container partitioned off from that containing the freight and in this way provide a self-propelling hull.

(b) One or more flexible hulls of the invention could be towed by a ship of any type travelling on or under the surface of the water.

Further features and advantages of the invention will be apparent from the ensuing description with reference to the accompanying drawings, to which the invention is in no way limited.

Figure 1:
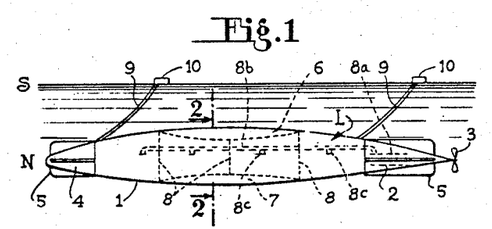
FIG. 1 is a side elevational view of a self-propelled hull embodying the invention.
Figure 2:
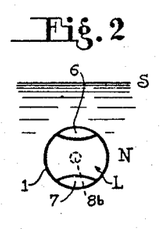
FIG. 2 is a sectional view taken along line 2—2 of FIG. 1.

With reference to FIGS. 1 and 2, it can be seen that a hull embodying the invention comprises essentially a flexible container or sheath 1 which resists the action of salt water and of the liquid load L; this container could be composed of, for example, plastified polyvinyl chloride reinforced or not and have the shape of a body having the least resistance to displacement, that is, a solid of revolution about an axis (horizontal under normal conditions of underwater travel) having a hydrodynamic profile somewhat similar to that of a cigar finely tapered at the rear. Such profiles are well known in the art.

The hull shown in FIGS. 1 and 2 is self-propelled and to this end it is provided with propelling means disposed, for example, at the rear in the space 2 and including a screw or propeller 3. The forward part 4 of the hull can contain, for example, the control and naviagting equipment and crew. Reference character 5 indicates the steering members, steering fins, rudders and the like.

The stability of the hull 1 and the control of the depth at which it travels relative to the line of separation S between the sea water and the air of the atmosphere, are ensured by an action on one or more chambers 6 of preferably variable volume which form ballast tanks and receive a light liquid or gas and by action on one or more chambers 7 receiving the ballast formed of a heavy liquid or a solid which could constitute a safety ballast released if need be to cause the hull 1 to rise to the surface S.

Intermediate partitions 8 could also be provided, which are composed of a material resisting attack by the liquid load L and divide this load into several identical or different load units and, if desired, reinforce the flexible container 1.

This container is, furthermore, advantageously kept in shape by putting it under a pressure higher than that prevailing in the sea at the level at which the container floats, this being effected either previously during loading or by means of pumps or blowers 8a which act through pipe 8b provided with several outlets 8c on the transported liquid L or, if desired, on the gases or liquids in the chambers 6 and 7.

Two sets of tubes 9 of the schnorkel type could be provided for connecting the forward and rear parts 4 and 3 respectively to floating members 10 and thus permit supplying fresh air to the crew and the machines, and evacuating foul air, fumes and harmful gases and the like.

Figure 3:
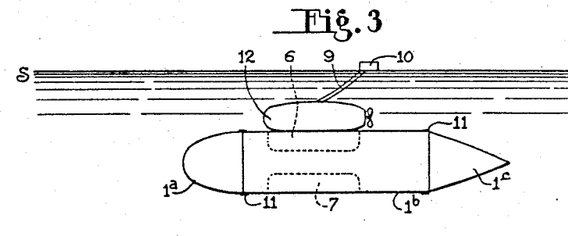
FIG. 3 is a side elevational view of a container embodying the invention rendered self-propelled by associated propelling means.
Figure 4:
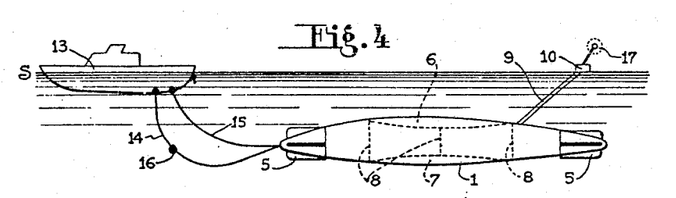
FIG. 4 is a side elevational view of a hull embodying the invention towed by a surface ship.
Figure 5:
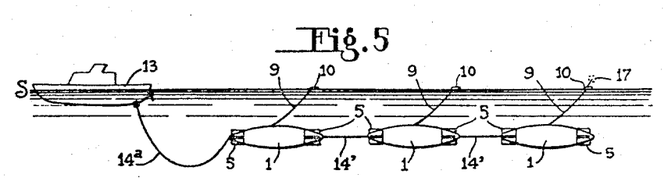
FIG. 5 is a side elevational view of a row of flexible hulls embodying the invention towed by a surface ship.
Figure 6:
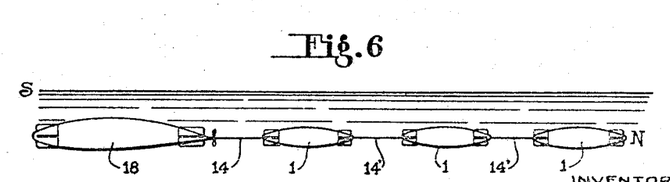
FIG. 6 is a side elevational view of a row of flexible hulls embodying the invention towed by an under-water ship.

If the hull embodying the invention does not comprise propelling means, it could be constructed more simply and cheaply, which permits, if desired, discarding it after some uses; the propelling means would then be placed in a device associated with the hull (FIG. 3) or in a towing ship (FIGS. 4–6).

A simplification of the construction of the hull could consist in constructing the latter from three portions 1ᵃ, 1ᵇ, and 1ᶜ of a flexible sheath, as in the case of the embodiment shown in FIG. 3. The portion 1ᵇ is cylindrical and is therefore easy to construct from a sheet of plastic material the edges of which are simply brought together and welded; the portion 1ᶜ is conical and can also be constructed easily by welding the two edges of a flat sheet of suitable shape; the forward portion 1ᵃ is more difficult to obtain, but it constitutes only a small part of the hull which latter is obtained by welding the portions 1ᵃ, 1ᵇ and 1ᶜ at 11 and 11'. The shape of the hull shown in FIG. 3 is not exactly that having the least resistance to displacement, but it is only very slightly different therefrom. In the case of transport in which the container is subsequently discarded, it is advantageous to effect a saving in the manufacturing costs, which fully compensates the extra energy output required by a shape which does not correspond exactly to the ideal shape.

The sheath 1ᵃ, 1ᵇ, 1ᶜ could comprise internal partitions (not shown), chambers 6 and 7 for a light gas and a heavy liquid respectively, and steering or guiding means (not shown).

This container is propelled by means of an auxiliary device 12 fixed to the container for example to the top of the container and contains the crew, navigation equipment and machines. A set of tubes 9 could connect this device to a floating member 10.

A container or hull which is of a relatively simple type and is shown in FIG. 4, could be towed either by a surface ship or by a ship travelling under the surface, this hull being towed alone or in a group of hulls.

Such a simplified hull comprises essentially forward and rear steering or guiding means 5, chambers 6 and 7 for stabilizing the hull and controlling the depth at which it travels and, if desired, internal partitions 8.

The hull is towed by the surface ship 13 through the cable 14. Control of the stabilization and of the depth at which the hull travels, could be effected advantageously at a distance on board the ship 13 either through the medium of a special control cable 15, which could be placed alongside the cable 14, or, for example electrically or pneumatically, through the medium of the towing cable 14. For example, the control could be effected by compressed air sent through the cable 14 which would be a hollow cable.

A hooking device 16 could also be provided on the cable 14 which is arranged to be immersed in the course of sailing and is rapidly accessible at the end of the towing operation by drawing up this cable. The hooking device 16 connects in a disengageable manner two separate portions of the cable 14, which are linked to the ship 13 and the container 1 respectively. At the end of the towing operation, the container 1 can be separated from the ship by disengagement of the hooking device and fixed to a bollard in the port by the portion of the cable 14 associated therewith. One or more signalling devices 17 of any type carried by one or more floats 10 could also be provided.

Hulls embodying the invention could be connected together in a row comprising several units; the connection between the units by means of cables 14' is very sound and easy, since the immersed hulls 1, which are not exposed to irregular dynamic effects existing on the surface of the water and are subjected only to forces which are substantially identical for identical hulls, resulting from the speed at which the row of hulls travels. As the towing ship 13, if it sails on the surface of the water (as shown in FIG. 5), is subjected to the irregular dynamic effects on the surface, it could be advantageous to provide a towing cable 14$^a$ having such length and weight that it assumes, when in use, a shape substantially in the form of a curve so as to form, by means of this cable 14$^a$, a flexible connection between the ship 13 subjected to the dynamic effects and the immersed hulls 1 not subjected to these effects.

FIG. 5 shows a row of three hulls 1 connected by cables 14' and towed by means of a cable 14$^a$ in the form of a catenary by the surface ship 13. Each hull comprises guiding means 5, a float 10 and, if desired, a signalling device 17.

In the embodiment shown in FIG. 6, the transport of the freight is effected by means of an under-water ship 18 of any type, for example a self-propelled hull of the type shown in FIGS. 1 to 3 which tows, through the medium of a cable 14, one or more flexible hulls 1. In the presently-described embodiment comprising several hulls 1, the latter are connected by cables 14'. As each unit of the row of hulls including the hull 18 is unexposed to the irregular dynamic effects existing on the surface of the water, it is subjected to the same set of forces resulting merely from the speed at which the row of hulls is travelling, and the stresses to which the cables 14 and 14' are subjected are as small and regular as possible.

Each flexible hull of the invention comprises of course at least one loading and unloading aperture so as to permit introducing the freight, which is preferably liquid or in powdered form and is introduced or withdrawn, for example hydraulically or pneumatically.

Figure 20:
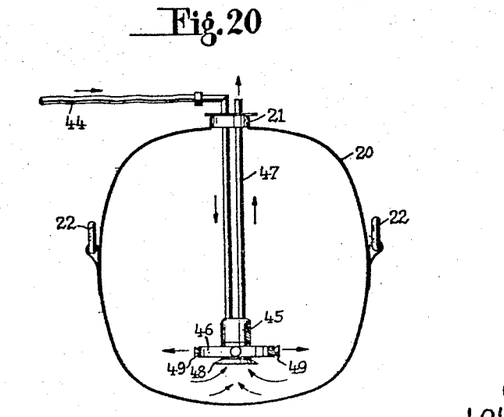
FIG. 20 is a sectional view of an embodiment of one of the secondary containers.

FIGS. 7–12 show a complete preferred embodiment of the invention in which the main container or flexible hull 1, which comprises two rigid end members forming the stern 2 and the prow 4, is adapted to contain secondary containers 20 provided with filling and emptying apertures 21 and handling means 22 (see also FIG. 20).

Figures 7, 8, 9, 10:
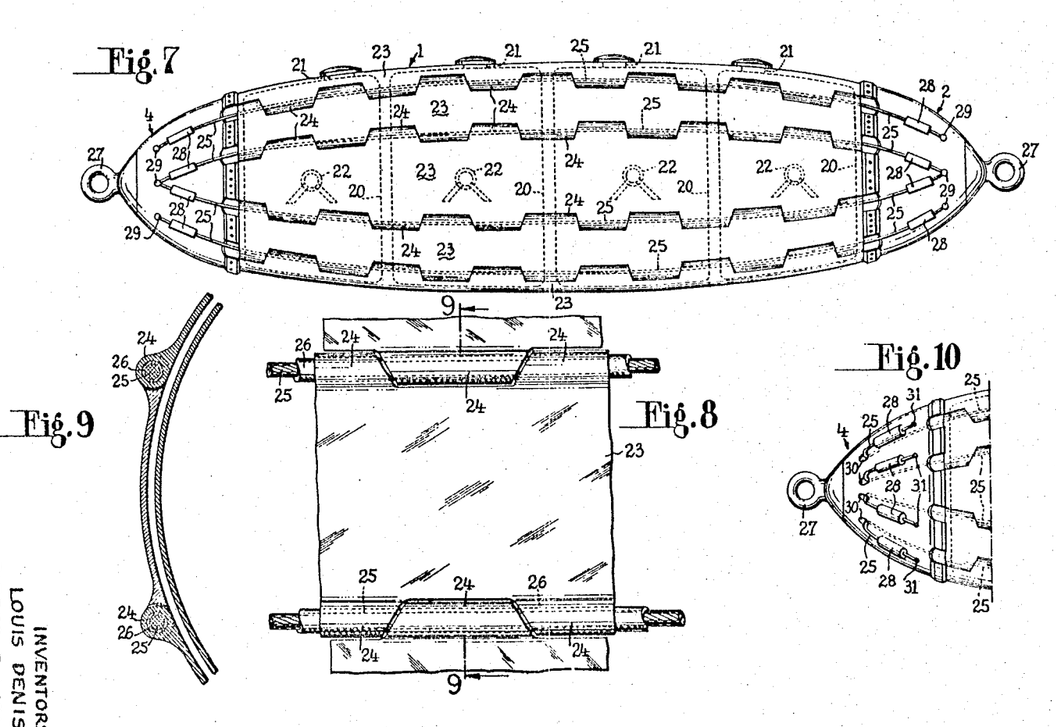
FIG. 7 is an elevational view of a double-container transport device embodying the invention.
FIG. 8 is a partial elevational view on an enlarged scale of one of the strips of the main container.
FIG. 9 is a sectional view taken along line 3—3 of FIG. 8.
FIG. 10 is an elevational view of one embodiment of the hooking means for the cable connecting means for the strips.

The hull 1 is composed of a series of longitudinal strips 23 the edges of which are provided with crenels or projections 24 which interlock with the adjoining crenels or projections in adjoining strips. Each projection 24 forms a cylindrical beading which acts as both a reinforcement and a housing for the passage of a cable 25. The latter, in passing alternately through the projections of one strip 23 and those of the adjacent strip provides a hinge or pivotal connection between the two strips. A protecting sheath or cover 26, for example composed of a reinforced plastic material, is preferably disposed inside each projection around the cable 25.

The set of cables 25, which constitutes a flexible reinforcement for the hull 1, is fixed at both ends to the members 2 and 4 which are composed, for example, of metal or rigid plastic material and which carry end rings 27 provided for the purpose of towing the hull. The cables 25 could be attached, as shown in FIG. 7, by means of tensioning devices 28 hooked to pins 29 carried by the members 2 and 4.

In another embodiment shown in FIG. 10, the members 2 and 4 are provided with a series of apertures 30, and each cable 25, which extends inside the end member and issues therefrom through the aperture 30, is put under tension and then hooked on a fixed member 31 carried by the outer wall of the end member.

This arrangement permits, when the end members are not connected to flexible hull elements, separating the end members from the hull and, for example, removing the tanks 20 without completely dismantling the unit.

Figures 11, 12:
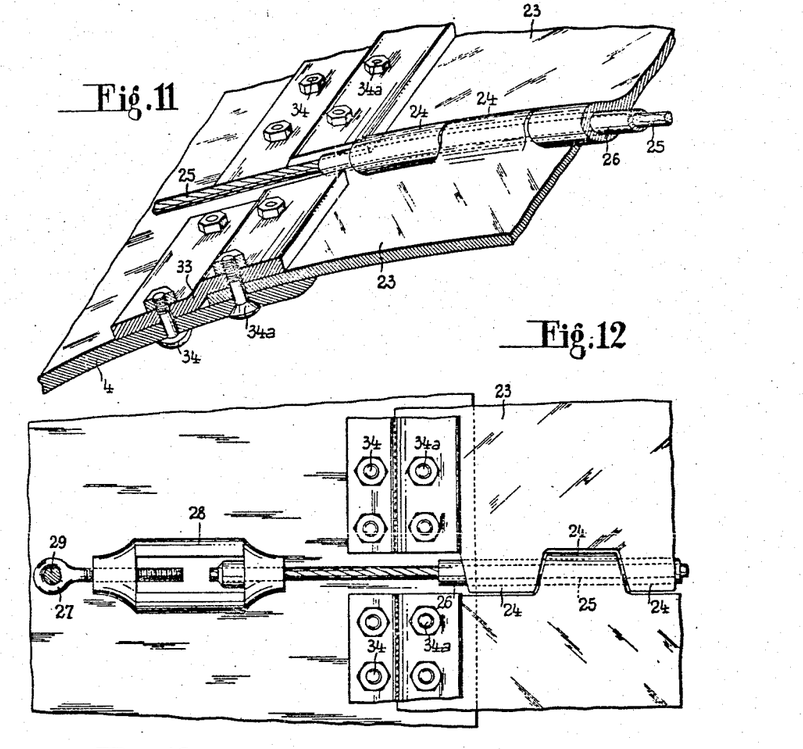
FIG. 11 is a perspective view, on an enlarged scale, of one arrangement for securing the strips and cables to the end members of the device.
FIG. 12 is a plan view, on an enlarged scale, corresponding to FIG. 11.

The attachment of the ends of the strips 23 on the end members 2 and 4 should preferably permit dismantling and could be arranged as shown in FIGS. 11 and 12. Each strip 23 bears against the outer wall of the end member 4 and is gripped between the latter and a hooking member 33, fixed to the end member by bolts 34. The strip 23 could be attached more rigidly by addition of bolts 34$^a$.

Figure 13:
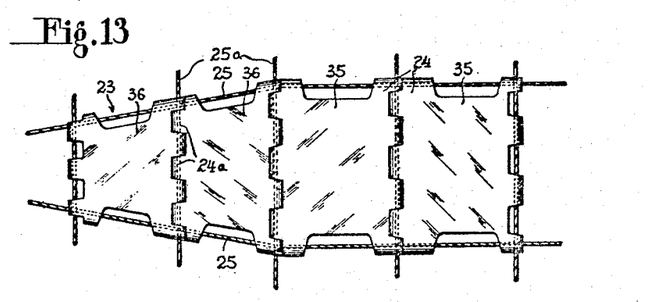
FIG. 13 is an elevational view of a part of another embodiment of the strip for the device.

In the illustrated embodiment, each strip 23 has been shown to consist of a continuous member the width of which varies from one end to the other in accordance with the shape of the hull. However, as shown in FIG. 13, each strip 23 could consist of adjoining quadrangular elements 35 and 36 provided on their longitudinal edges with the projections 24 for the cables 25 and connected together in any suitable manner along their transverse edges. Advantageously these transverse edges are also provided with projections 24$^a$, similar to the projections 24, and acting as a housing for cables 25$^a$ looped on themselves transversely of the hull. This arrangement of separate strip elements permits modifying the outside shape of the hull. For example, rectangular elements 35 could be placed against trapezoidal elements 36. Using a group of trapezoidal elements next to a group of rectangular elements has for effect to modify the diameter of the container or hull and imparts thereto an ogival or ovoidal shape or any other desired shape.

The flexibility of the material utilized and the method of interconnecting the strips permits deformation of the hull under the effect of the forces to which it is subjected when travelling under the water and thus allows it to assume a shape close to the ideal shape for least resistance to displacement.

The strip 23 could be composed of, for example, natural or artificial rubber, if necessary preferably reinforced, for example, by a suitable textile or metallic reinforcement similar to the arrangement used in the manufacture of conveyor or transmission belts.

In the embodiment shown in FIG. 7, the projections 24 of two adjoining strips 23 interlock and each cable 25 extends through a continuous sheath. If desired, it could be arranged that parts of the cable 25 remain uncovered to permit hooking onto the cable 25 accessories which must be detachable or movable such as keels, floats, ballasts, tanks, suspension rings etc., the attachment to the cable being obtained either by means of additional projections, blocks, rings, hooks or the like.

Figure 14:
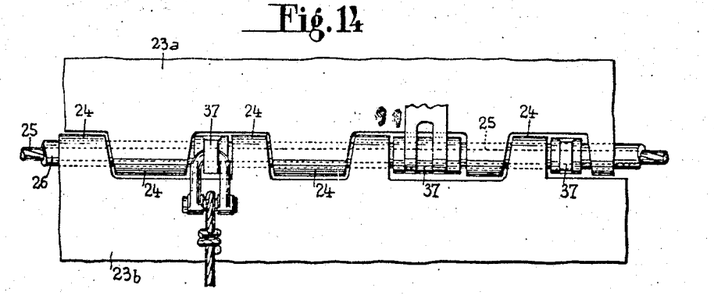
FIGS. 14 and 15 are diagrammatic elevational views of arrangements for fixing accessories to the hull.
Figure 15:
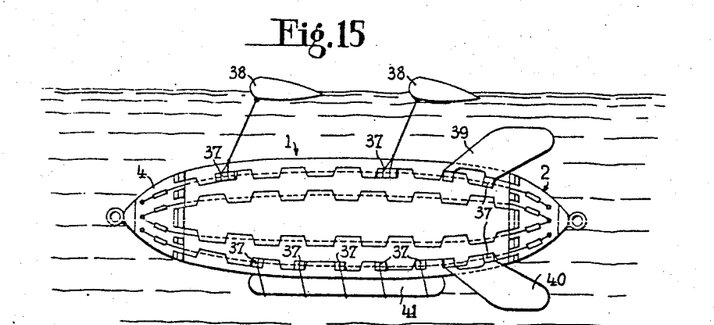

Such an arrangement is shown diagrammatically in FIGS. 14 and 15. FIG. 14 shows spaced-apart projections 24 of the two strips 23$^a$ and 23$^b$, and disposed in the spaces are intermediate blocks 37 pertaining to attachment means for devices such as those shown in FIG. 15, namely floats 38, fins 39 and 40, and ballast tanks 41.

Figure 16:
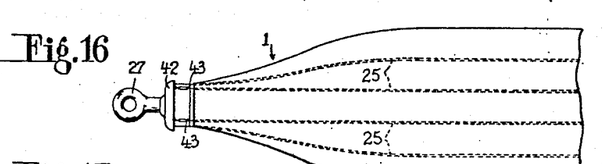
FIGS. 16 and 17 are diagrammatic elevational views of another arrangement for fixing the ends of the strips.
Figure 17:
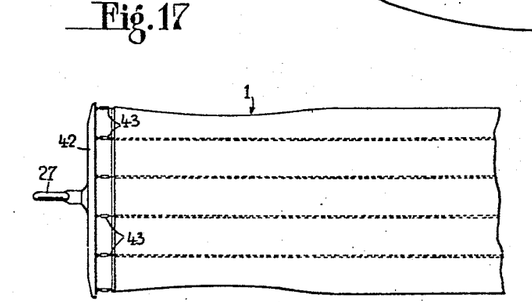

FIGS. 16 and 17 show diagrammatically another embodiment of the attachment device for the ends of the strips 23. According to this embodiment, the body of the 1 is cylindrical over the whole of its length and the ends of the strips are interconnected by flattening the hull at the ends and connecting the latter to an elongated member 42 which has a substantially rectangular shape and to which the ends of the cables 25 are fixed and blocked by means of suitable devices 43. These connecting devices can be, for example, those shown in FIGS. 11 and 12.

Figure 18:
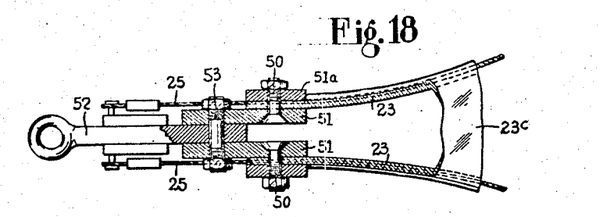
FIGS. 18 and 19 are views of a modification of the arrangement shown in FIGS. 16 and 17.
Figure 19:
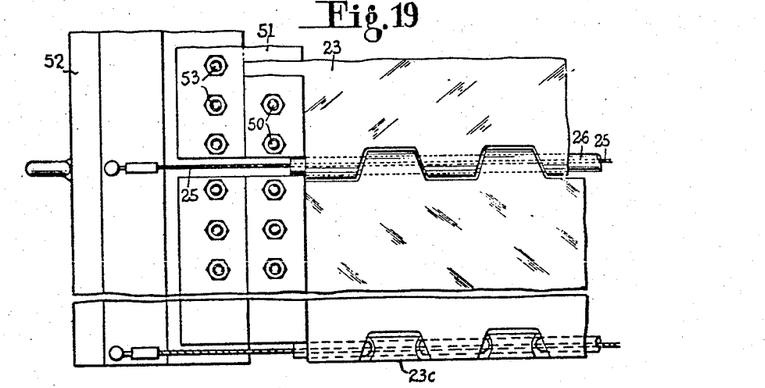

In a modification of this embodiment, shown in FIGS. 18 and 19, the ends of the strips 23 are clamped between intermediate plates or gripping members 51, 51ª by means of bolts 50 and the plates 51, in turn, are bolted to the end members, each constituted by a substantially rectangular plate 52, by means of bolts 53 passing through said plates 52 and provided with nuts on both sides of the latter. The plates 51, 51ª have a transverse extent equal to the width of the strips 23 and the cables 25 pass therebetween, being fixed and blocked on the plates 52 as in the previous embodiment. The outermost cables 25 hold in place the strips 23ᶜ extending along the longitudinal edges of the plates 52 and which are not provided with plates 51 and 51ª. This arrangement has the advantage of permitting dismantling the ends of the hull without having to touch the flexible strips and utilizing the plates 51 for reconstituting the polyhedral arrangement of the assemblage of strips 23, using if required outside handling means.

In any case, the gripping members could support any associated devices (ballast, fins, equipment) which have been reversed at the prow and the stern.

The secondary containers 20 adapted to contain the freight could have any shape and preferably the simplest possible shape. They must be composed of a material which resists the attack of sea water and the attack of the transported product. If hydrocarbons are transported, this material could be, for example, of a type containing synthetic rubber, such as chloroprene or acrylonitrile or any other product having a resistance to hydrocarbons, such as vinyl polychloride, reinforced or not and mixed or not with natural rubber. The flexible elements could be, if desired, reinforced with fabric, metallic or other insertions which impart thereto the desired strength.

The composition of the container could be modified in accordance with the nature of the product to be transported. For example, isobutylene could be used if acid products are transported, reinforcing agents such as activated carbon blacks or other pigments could be used if abrasive powders are transported.

If a liquid load or cargo is transported, such as petrolium or mineral oil products, the containers 20 could also be used for containing ballast for example for determining the depth at which the container floats or for improving the equilibrium of the hull, if the following method is adopted. The ballast is then composed of a solid powdered product such as a metallic oxide, for example magnetite, in suspension in the petroleum, or of a liquid such as barium oxide which forms with the transported liquid an emulsion which is easily broken when it is desired to separate the ballast and the freight. In this case, the suspension or emulsion must remain as such during transport so as to obtain a constant specific weight in the various containers and to evenly distribute the weight of the ballast and thus reduce the localized forces supported by the container. When the agitating or emulsifying device is stopped, the freight and the ballast are rapidly separated and the former can be withdrawn without entraining the latter. If the ballast is magnetite, complete separation can be obtained with a magnetic device.

In general, the ballast could be a commercial product such as ore, a solid fuel etc. the transport of which is advantageously combined with the transport of the main merchandise.

FIG. 20 shows an embodiment of the container 20 which permits maintaining a mixture of freight and ballast. A pipe 44, for example connected to an air compressor on the towing boat, supplies compressed air to a motor 45 driving a pump 46 disposed at the lower part of the container 20. The compressed air escapes into the water out of the container 20 and hull 1 by way of a pipe 47. The pump 46 draws the mixture in at 48 at the lower part and discharges it laterally at 49, thereby creating a thorough and continuous agitation of the mixture.

The mixture could also be maintained by slowly rotating the hull, obtained for example by disposing the fins 39 and 40 obliquely, the ends of the attachment ends 27 being arranged to this end.

Figure 21:
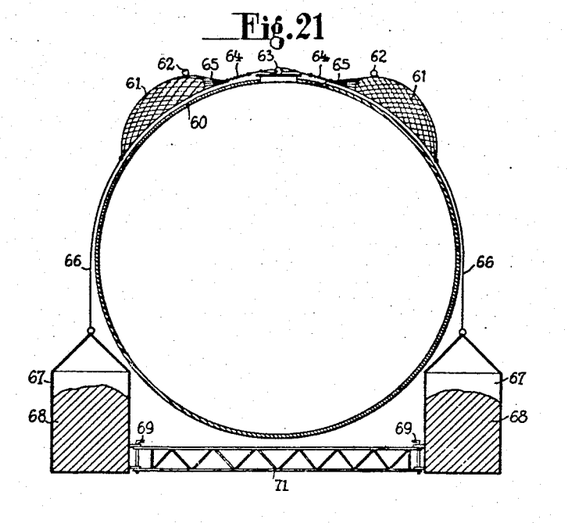
FIG. 21 is a cross-sectional view of another embodiment of a secondary container showing an economical ballast arrangement.
Figure 22:
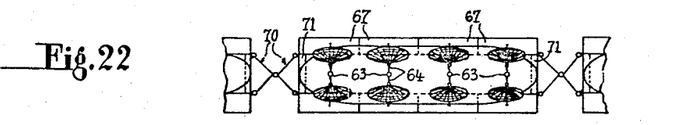
FIG. 22 is a partial plan view of the embodiment shown in FIG. 21.
Figure 23:
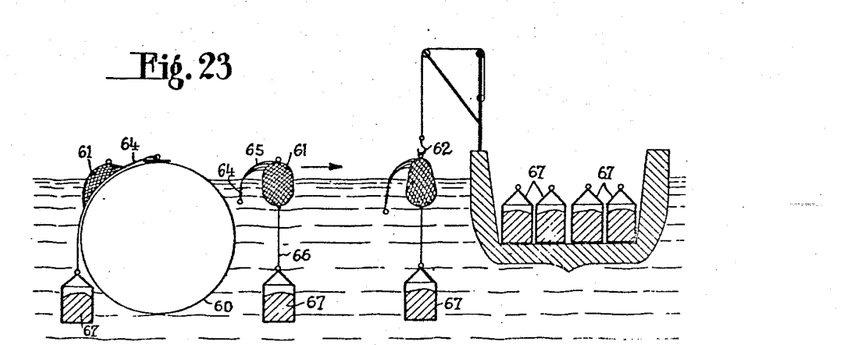
FIG. 23 is a diagrammatic view of a method of removing the ballast-carrying equipment.

FIGS. 21 and 23 show a particularly advantageous embodiment permitting obtaining an equilibrium of the hulls and transporting and unloading a ballast of commercial value.

The hull 60, which is of the general type described hereinbefore, comprises on both sides several assemblages. Each assemblage comprises: an inflatable chamber 61 which is provided with attachment means 62 and is connected, on the one hand, to a hooking member 63 provided on the hull 60 preferably by means of a resiliently yieldable connection 64 and, if desired, a load distributor such as a net 65, and, on the other hand, to a flexible or rigid box 67 by means of a connecting member 66; the box 67 contains ballast 68.

The boxes 67 can be if desired interconnected or tied by connecting members 71 which are attached or detached by members 69.

A connection between a plurality of towed hulls can be obtained, when the lower boxes 67 are rigid or sufficiently strong, by cables or other means 70 directly connected to the boxes 67, which later are connected to one another. This permits decreasing the forces on the flexible material.

The advantages of this particular arrangement are obvious: each assemblage consisting of the inflatable chamber 61, a box 67 and their connecting members 64, 65 and 66, is independent when detached from the hull and can float freely and be guided as desired.

These assemblages can be used for transporting a ballast of commercial value, such as coal or iron ore. The handling in the port, diagrammatically illustrated in FIG. 23, is particularly simple.

The position of the hull relative to the surface of the water is determined by suitably inflating the chambers 61 and regulating the amount of ballast.

In any case, the initial hydrostatic equilibrium of the hull is rendered permanent during transport and as a function of possible variations of temperature and of the density of the sea water by the system of ballast adjustment.

Although specific embodiments of the invention have been described, many modifications and changes may be made therein without departing from the scope of the invention as defined in the appended claims.

Having described our invention what we claim as new and desire to secure by Letters Patent is:

1. Device for under-water transport of freight, such as fluid freight, comprising an elongated flexible main container whose shape is substantially that corresponding to minimum resistance of the container to displacement in water, said main container comprising strips of flexible material which is resistant to the action of sea water, said strips extending longitudinally of said container in laterally adjacent relation to one another, hinge means interconnecting the adjacent edges of said strips, two end members which constitute the prow and stern of said device and are connected to the ends of said strips, and flexible fluid-tight secondary containers disposed inside said main container and adapted to contain said freight and composed of a material which is resistant to the action of sea water and to the action of the product constituting said freight.

2. Device as claimed in claim 1, wherein each of said strips consists of a continuous member whose width varies, at least at its ends.

3. Device as claimed in claim 1, wherein each strip comprises a series of elements disposed in adjacent relation to one another longitudinally of said container.

4. Device as claimed in claim 1, wherein said end members are substantially conical, rigid hollow members.

5. Device for under-water transport of freight, such as fluid freight, comprising an elongated flexible main container whose shape is substantially that corresponding to minimum resistance of the container to displacement in water, said main container comprising strips of flexible material which is resistant to the action of sea water, said strips extending longitudinally of said container in laterally adjacent relation to one another, two end members which constitute the prow and stern of said device and are connected to the ends of said strips, projections formed on the longitudinal edges of each of said strips which projections are interposed between the projections on the adjacent strips, a longitudinal passageway formed in each of said projections, flexible elements extending through the passageways pertaining to the projections of adjacent strips for pivotably interconnecting the latter, the ends of said flexible elements being connected to said end members, and flexible fluid-tight secondary containers disposed inside said main container and adapted to contain said freight and composed of a material which is resistant to the action of sea water and to the action of the product constituting said freight.

6. Device as claimed in claim 5, wherein said flexible elements are cables.

7. Device as claimed in claim 5, wherein a flexible protecting sheath is disposed between said flexible elements and said passageways.

8. Device as claimed in claim 5, further comprising connecting devices connecting said end members to said flexible elements and to said strips and adapted to permit detaching said end members from said elements and strips.

9. Device as claimed in claim 5, wherein said projections constitute continuous beadings surrounding said flexible elements.

10. Device as claimed in claim 5, wherein some of said projections are spaced apart so as to leave some parts of said flexible elements bare for the connection of accessories for said main container.

11. Device for under-water transport of freight, such as fluid freight, comprising an elongated flexible main container whose shape is substantially that corresponding to minimum resistance of the container to displacement in water, said main container comprising strips of flexible material which is resistant to the action of sea water, said strips extending longitudinally of said container in laterally adjacent relation to one another, hinge means interconnecting the adjacent edges of said strips, two end members which constitute the prow and stern of said device and are connected to the ends of said strips, each of said end members being elongated, rigid and substantially rectangular, the ends of said main container connected to said end members being flattened to substantially correspond to the rectangular shape of said end members, and flexible fluid-tight secondary containers disposed inside said main container and adapted to contain said freight and composed of a material which is resistant to the action of sea water and to the action of the product constituting said freight.

12. Device for under-water transport of freight, such as fluid freight, comprising an elongated flexible main container whose shape is substantially that corresponding to minimum resistance of the container to displacement in water, said main container comprising strips of flexible material which is resistant to the action of sea water, said strips extending longitudinally of said container in laterally adjacent relation to one another, two end members which constitute the prow and stern of said device and are connected to the ends of said strips, projections formed on the longitudinal edges of each of said strips which are interposed between the projections on the adjacent strips, a longitudinal passageway formed in each of said projections, flexible elements extending through the passageways pertaining to the projections of adjacent strips for pivotably interconnecting the latter, the ends of said flexible elements being connected to said end members, each of said end members being elongated, rigid and substantially rectangular, the ends of said main container being flattened to substantially correspond to the rectangular shape of said end members, and flexible fluid-tight secondary containers disposed inside said main container and adapted to contain said freight and composed of a material which is resistant to the action of sea water and to the action of the product constituting said freight.

13. Device as claimed in claim 12, wherein rigid plates having substantially the same width as the widths of said flexible strips are fixed to the latter and are directly attached to said end members.

14. Device for under-water transport of liquid freight comprising an elongated flexible main container whose shape is substantially that corresponding to minimum resistance of the container to displacement in water, said main container being composed of a material which is resistant to the action of sea water, chambers combined with said main container for containing gases, flexible fluid-tight secondary containers disposed inside said main container and adapted to contain said freight and composed of a material which is resistant to the action of the product constituting said freight, freight filling and emptying apertures prvoided in said secondary containers, ballast disposed in said secondary containers, and a mixing device disposed inside each of said secondary containers for mixing the liquid freight and ballast so that the latter is maintained dispersed in the freight at a substantially constant density.

15. Device as claimed in claim 14, wherein the ballast is in the form of a powdered product, in suspension in the liquid freight.

16. Device as claimed in claim 14, wherein said ballast is a liquid, in emulsion in the liquid freight.

17. Device for under-water transport of freight, such as fluid product, comprising a flexible main container whose shape is substantially that corresponding to minimum resistance of the container to displacement in water, said main container being composed of a material which is resistant to the action of sea water, flexible fluid-tight secondary containers disposed inside said main container and adapted to contain said freight and composed of a material which is resistant to the action of said freight, first and second chambers combined with said container, said first chambers containing variable volumes of gases and said second chambers containing variable amounts of ballast weight, whereby the initial hydrostatic equilibrium of said container is maintained, and said first and second chambers being disposed outside said container and constituting independent floatable units arranged on both sides of said container.

18. Device as claimed in claim 17, wherein said second chambers are interconnected and constitute an assemblage connected to said container through the medium of which assemblage the latter can be towed by motive means.

19. Device as claimed in claim 18, wherein said second chambers are formed of rigid boxes.

20. Device for under-water transport of freight, comprising an elongated flexible main container composed of a material which is resistant to the action of sea water, flexible fluid-tight secondary containers disposed inside said main container and adapted to contain said freight and composed of a material which is resistant to the action of the product constituting said freight, motive means and a housing enclosing the latter and detachably combined with said main container, said housing being formed in one end of said container.

References Cited in the file of this patent

UNITED STATES PATENTS

| | | |
|---|---|---|
| Re. 22,876 | Gray et al. | May 13, 1947 |
| 34,426 | Howard | Feb. 18, 1867 |
| 1,312,356 | Reid | Aug. 5, 1919 |
| 2,359,366 | Katcher et al. | Oct. 3, 1944 |
| 2,371,040 | Mumford | Mar. 13, 1945 |
| 2,391,926 | Scott | Jan. 1, 1946 |
| 2,492,699 | Houwink | Dec. 27, 1949 |
| 2,727,485 | Combs | Dec. 20, 1955 |

FOREIGN PATENTS

| | | |
|---|---|---|
| 885,079 | France | May 17, 1943 |

UNITED STATES PATENT OFFICE
CERTIFICATE OF CORRECTION

Patent No. 3,018,748                                    January 30, 1962

Louis Denis et al.

It is hereby certified that error appears in the above numbered patent requiring correction and that the said Letters Patent should read as corrected below.

Column 2, line 61, for "ittached" read -- attached --; column 3, lines 72 and 73, for "naviagting" read -- navigating --; column 7, line 3, after "the", first occurrence, insert -- hull --; column 8, line 37, for "later" read -- latter --; column 10, line 34, for "prvoided" read -- provided --.

Signed and sealed this 3rd day of July 1962.

(SEAL)
Attest:

ERNEST W. SWIDER                                DAVID L. LADD
Attesting Officer                                    Commissioner of Patents